United States Patent [19]

Saidi

[11] Patent Number: 5,561,007
[45] Date of Patent: Oct. 1, 1996

[54] CATHODE-ACTIVE MATERIAL BLENDS OF $LI_xMN_2O_4$ AND $LI_Y$-$\alpha$-$MNO_2$

[76] Inventor: M. Yazid Saidi, 1800 N. Green Valley Pkwy. #424, Henderson, Nev. 89014

[21] Appl. No.: 559,119

[22] Filed: Nov. 17, 1995

[51] Int. Cl.⁶ .......................... H01M 4/50; H01M 10/36
[52] U.S. Cl. ............................................ 429/224; 429/192
[58] Field of Search ..................... 429/224, 191, 429/192

[56] References Cited

U.S. PATENT DOCUMENTS 5,429,890  7/1995  Pynenburg et al. ................ 429/224 X Primary Examiner—John S. Maples
Attorney, Agent, or Firm—Robert Krebs

[57] ABSTRACT

A solid secondary, lithium electrochemical cell comprises a physical mixture of $Li_xMn_2O_4$(spinel) ($0<x\leq2$) and $Li_y$-$\alpha$-$MnO_2$ ($0\leq y<1$). The cell is particularly suitable for use with anodes carbon materials.

8 Claims, 3 Drawing Sheets

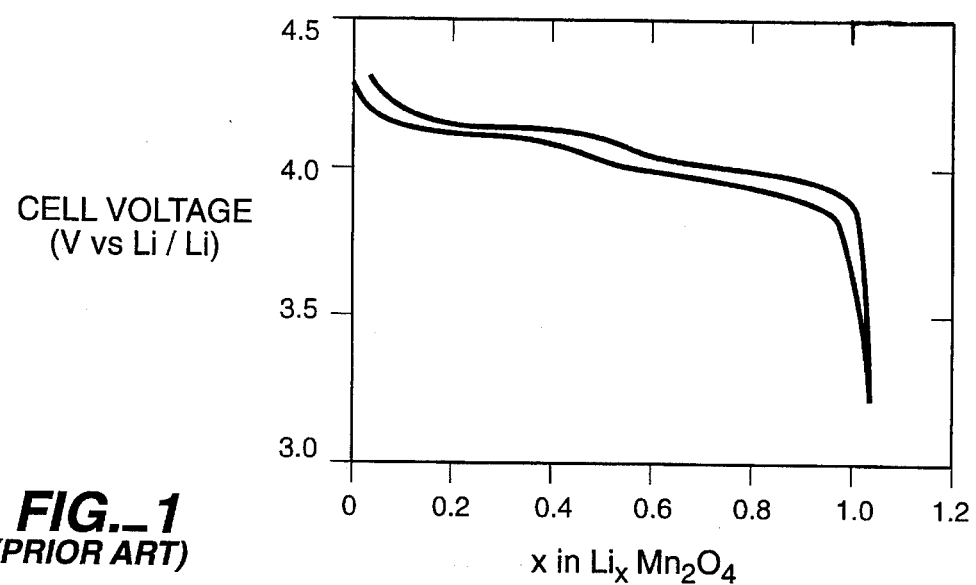
FIG._1
(PRIOR ART)
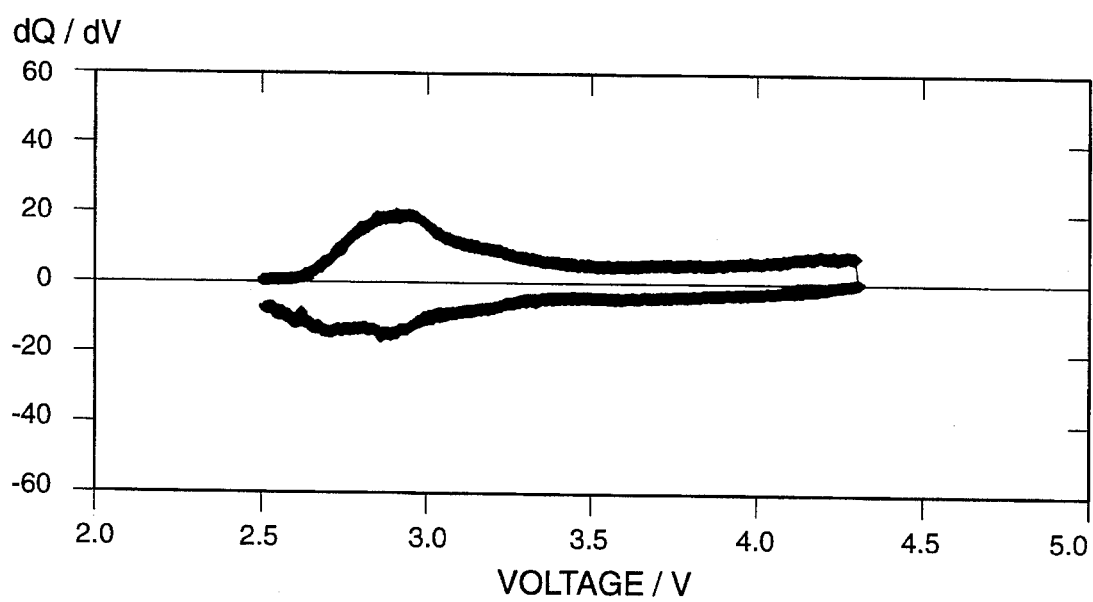
FIG._2

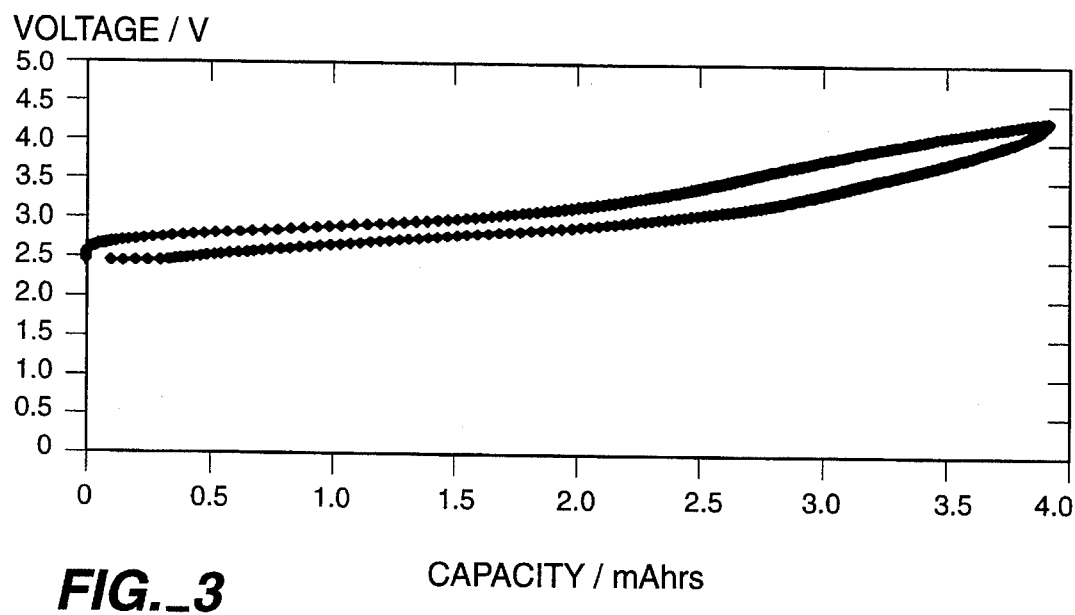
FIG._3
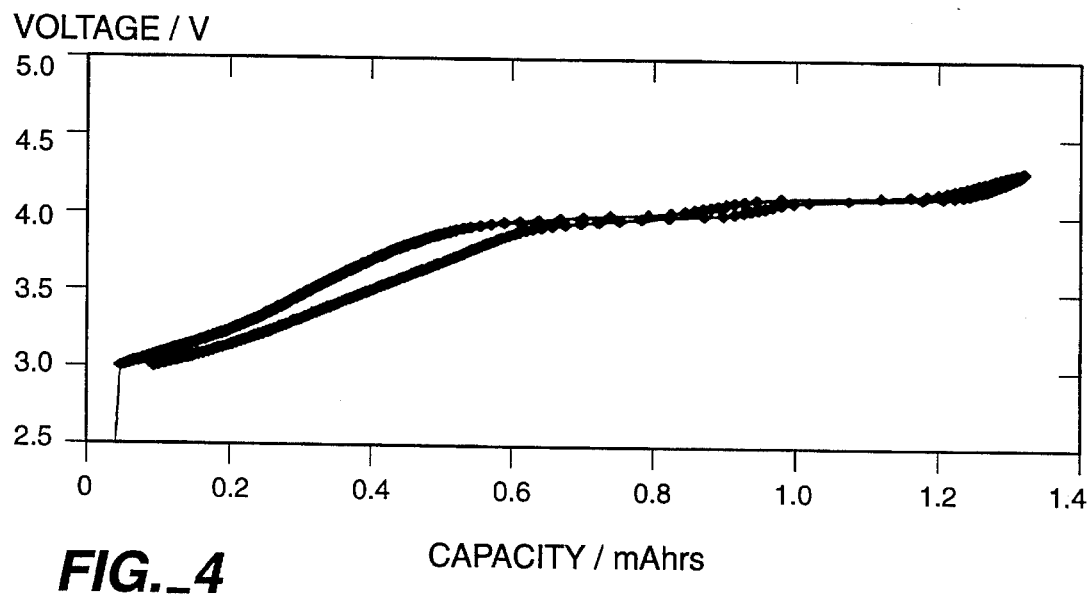
FIG._4

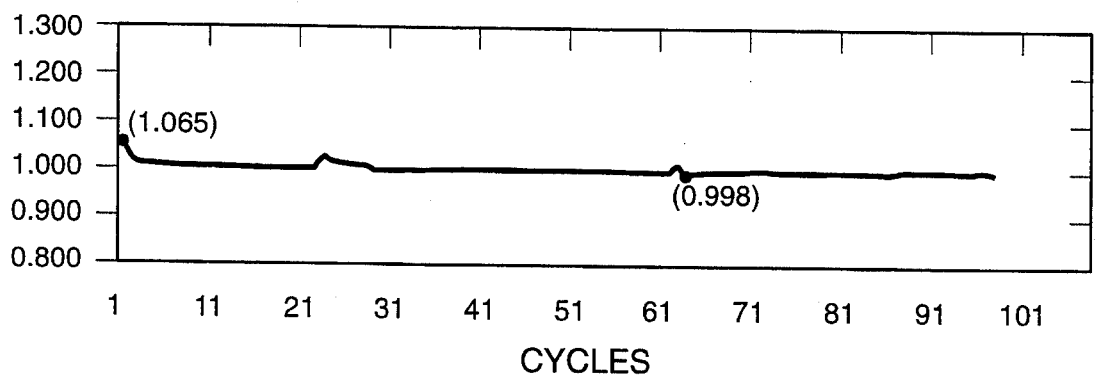
FIG._5A
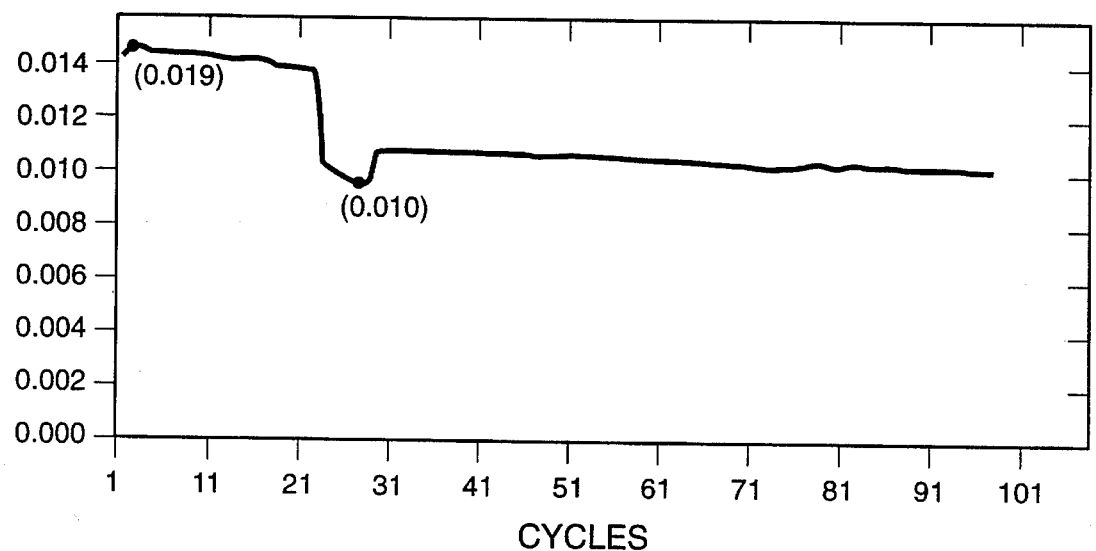
FIG._5B

CATHODE-ACTIVE MATERIAL BLENDS OF $LI_xMN_2O_4$ AND $LI_y$-α-$MNO_2$

FIELD OF THE INVENTION

This invention relates to the composition of higher voltage and higher capacity solid secondary lithium electrochemical cells. Specifically, the invention relates to the composition of intercalation cathodes and anodes.

BACKGROUND OF THE INVENTION

Secondary lithium batteries having an intercalation compound as cathode and a lithium metal anode have been extensively studied because of their commercial potential. The bulk of these studies have been concerned with liquid electrolyte cells, having cell voltages in the vicinity of 3.0 volts, which is readily obtainable with vanadium oxide intercalation cathodes and lithium metal anodes. Solid electrolyte cells, particularly, solid polymeric electrolyte cells, have also seen increasing interest. While the high specific capacity (about 380 $AhKG^{-1}$) of lithium cells and their high voltage provide energy densities higher than other electrochemical systems, it is believed that these cells can be improved in several ways. Specifically, we look to cathodes of higher voltage, greater than 3.6 volts, relative to the reference electrode ($Li/Li^+$), smoother voltage declines during discharge of the cell, higher charge capacity, and the replacement of lithium metal anodes with intercalation anodes. In the later case, the cell voltage is the difference in electrochemical potential of lithium within the two intercalating electrodes. This electrode composition has been called the "rocking chair" battery because lithium ions move back and forth between the intercalation compounds during charge/discharge cycles.

Potential drawbacks to rocking chair cells include lower output voltage and energy density compared to lithium metal cells. The use of compounds which reversibly intercalate lithium at higher voltage, such as, $LiNiO_2$, $LiCoO_2$ and $LiMn_2O_4$ may ameliorate these drawbacks. Recently, several manufacturers have expressed their interest in developing batteries based on the use of one of the higher voltage intercalation materials in cathodes and a form of carbon as the intercalation anode.

J. M. Tarascon et al., Electrochim. Acta 38 (1993) 1; J. Electrochem. Soc. 138 (1991) 2864; 139 (1992) 937; 138 (1991) 2859; U.S. Pat. No. 5,135,732 and U.S. Pat. No. 5,196,279 review the method of making and the use of $Li_xMn_2O_4$ (0<X≤2) intercalation electrodes in cells containing liquid electrolytes and lithium metal or carbon anodes, e.g. $Li_xC_6$ (0≤X≤1). The disclosure of each of the foregoing references is incorporated herein in its entirety.

The use of intercalation cathodes or anodes composed of mixed oxides and other materials has led to conflicting claims in the technical literature of lithium liquid electrolyte cells. U.S. Pat. No. 4,310,609 discloses a composite cathode material comprising at least one metal oxide incorporated in the matrix of a host metal oxide for use in a non-aqueous liquid electrochemical cell with a lithium metal anode. The metal oxides are thermally treated in the mixed state. The cathode material of this disclosure can be constructed by the chemical addition, reaction, or otherwise intimate contact of various metal oxides or metal elements during thermal treatment in mixed states. Alternatively, the metal oxide may be the product of the thermal treatment of a single metal oxide. U.S. Pat. No. 4,770,960 reports a lithium liquid electrolyte cell using a cathode active material which is the complex oxide $LiCo_{1-x}Ni_xO_2$ made from calcined mixtures of $Li_2CO_3$, $CoCO_3$ and $NiCO_3$. Furthermore, the discharge capacity decreased with the increase in nickel content for x>0.27. The recommended cathode active materials were those having 0<x≤0.27. U.S. Pat. No. 5,053,297 discloses cathode active materials which contain as a primary active material a first lithium compound having an electrochemical potential which is more noble than the electrochemical potential of the current collector, and an auxiliary active material which is a second lithium compound having an electrochemical potential which is more base than the electrochemical potential of the current collector. Examples include physical mixtures of $LiNiO_2$ and $LiCoO_2$, as well as chemical mixtures i.e. $LiNi_{0.95}Co_{0.05}O_2$, for use in lithium liquid electrochemical cells. The electrolyte may alternatively be a gel electrolyte. The addition of auxiliary active material decreases the battery capacity. The preferred anode is a carbon material. European patent application 91119471.0 (Publication 0486950A1) discloses a liquid electrolyte secondary lithium cell having an intercalation carbon anode and a cathode which comprises a lithium-containing metal complex oxide of the formula $Li_xMO_2$, wherein x is 0.5≤x≤1 and M is selected from the group Co, Ni and Mn. Examples of the metal complex oxides include $LiCoO_2$, $LiNiO_2$, $LiNi_yCo_{1-y}O_2$, (0<y<1), $LiMn_2O_4$ and mixtures thereof. The cathode active material is ordinarily used in combination with a conductive agent such as graphite and a binder therefor such as polyvinylidene fluoride. The average discharge voltage of the cell is about 3.6 volts., U.S. Pat. No. 5,429,890 discloses a secondary lithium electrochemical cell having a cathode which comprises a physical mixture, of $Li_xM_nO_2$ (Spinel) and at least one lithiated metal oxide selected from $Li_xNiO_2$ and $Li_xCoO_2$, wherein 0<x<2. The disclosures of each of the foregoing references is incorporated herein in its entirety.

It is characteristic of the higher capacity intercalation compounds used as active cathode materials that each compound accepts lithium ions at a series of unique voltages. Typically, the discharge curves include a series of inflections. $LiMn_2O_4$ produces voltage plateaus at 4.1 volts, 3.9 volts and 2.9 volts, (versus $Li/Li^+$) on cell discharge. $LiCoO_2$ produces a voltage plateau at 3.7 volts. It would be advantageous if a continuous and smooth voltage profile over a relatively large voltage range could be obtained for the solid lithium cell. Furthermore, it would be highly desirable to tailor the voltage profile to the requirements of the cell and its use.

SUMMARY OF THE INVENTION

The invention relates to solid secondary lithium electrochemical cells. In particular, cells, in which a solvent-containing polymer matrix is interposed between an anode and a cathode. More particularly, the invention relates to cells in which the cathode active material is a physical mixture of intercalation compounds consisting of $Li_xMn_2O_4$ (spinel) and $Li_y$-α-$MnO_2$ wherein 0<x≤2 and 0≤y<1. The improvement produced by use of physical mixtures of these metal oxides is a smooth voltage profile during discharge, substantially without inflections and discontinuities.

BRIEF DESCRIPTION OF THE DRAWINGS

FIG. 1 is a typical charge/discharge cycle of a cell with a cathode of $Li_xMn_2O_4$ between 3 and 4.3 volts at a current rate of 10 μA/$cm^2$ in which lithium metal is the negative electrode.

FIG. 2 displays the differential capacity during charge and discharge vs. cell voltage of a solid, secondary lithium cell composed of a solid electrolyte, a lithium metal anode and a cathode whose cathode-active materials comprises $Li_y$-$\alpha$-$MnO_2$.

FIG. 3 displays the voltage profile of the cell of FIG. 2 vs. the cell capacity over a complete charge/discharge cycle.

FIG. 4 displays the voltage profile of the cell with a cathode comprising a physical mixture of $Li_y$-$\alpha$-$MNO_2$ and $Li_xMn_2O_4$ in 1:1 weight ratio vs. the cell capacity over a complete charge/discharge cycle.

FIG. 5A and 5B display the discharge ratio and recharge capacity, respectively vs. cycle for the cell of FIG. 4.

DETAILED DESCRIPTION OF PREFERRED EMBODIMENTS OF THE INVENTION

The invention is directed to certain solid secondary lithium cells containing a composite cathode which is a physical mixture of cathode active materials. The mixture comprises $Li_xMn_2O_4$ ($0<x\leq2$) and $Li_y$-$\alpha$-$MnO_2$ ($0\leq y<1$). Preferably, the anode comprises a compatible anodic carbon material.

FIG. 1 is a graphical representation on coordinates of x in $Li_xMn_2O_4$ (spinel) against voltage in volts showing the cycling characteristics between 3 and 4.3 volts at a current density of 10 $\mu A/cm^2$ for powder compositions of $Li_xMn_2O_4$ used initially as the positive electrode in a secondary lithium battery in which lithium metal is used as the negative electrode. As is apparent, the voltage profile for the $Li_xMn_2O_4$ (spinel) shows an approximately 1 volt drop. This feature is very detrimental in many applications that utilize the full 4 volt capacity, such as in electric vehicles, of secondary batteries using $Li_xMn_2O_4$ as the cathode material. Specifically, if the battery voltage is at the end of the curve, that is when x is equal to about 1, the battery voltage will decrease precipitously by about 1 volt if even a small amount of capacity is drawn from the battery.

The present invention is based, in part, on the discovery that addition of $Li_y$-$\alpha$-$Mn_2O_4$ ($0\leq y<1$) to $Li_xMn_2O_4$ (spinel) ($0<x\leq2$) forms a cathode mixture which, when employed in a secondary battery, produces a smoother voltage profile without the precipitous voltage drop.

Prior to describing the invention in further detail, the key terms are defined below.

Definitions

The term "a solid lithium secondary cell or battery" or "solid secondary cell or battery" refers to a composite electrochemical cell comprising a lithium anode; a solid, solvent and inorganic ion-containing electrolyte; and a compatible anode; which cell is capable of repeated charge-discharge cycles; and a battery comprising two or more such cells. Typically, the solid, solvent-containing electrolyte comprises a solid polymeric matrix hereinbelow defined.

The anode of the present invention preferably comprises an anode film that is laminated onto one or both sides of the current collector which is a thin metal foil or grid. Typically, each anode film is from about 100 μm to about 250 μm in thickness, preferably about 110 μm to about 200 μm, and more preferably about 125 μm to about 175 μm Similarly, the cathode of the present invention preferably comprises a cathode film that is laminated onto one or both sides of the current collector which is a thin metal foil or grid. Typically, each cathode film is from about 100 μm to about 250 μm in thickness, preferably about 130 μm to about 175 μm, and more preferably about 140 μm to about 165 μm.

The anode and cathode each also includes a current collector that comprises, for example, a screen, grid, expanded metal, woven or non-woven fabric or knitted wire formed from an electron conductive material such as metals or alloys. Preferably, the current collector has a thickness from about 5 μm to about 75 μm, preferably about 35 μm to about 65 μm, and more preferably about 45 μm to about 55 μm. Each current collector is also connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. No. 4,925,752, 5,011,501, and 5,326,653, which are incorporated herein.

The term "cycle" refers to a combined charge one-half cycle and a discharge one-half cycle, whereby the cell or battery takes in and stores electrical energy in a charge one-half cycle and releases electrical energy in a discharge one-half cycle.

The term "charge capacity" herein denoted Q, refers to the maximum charge measured in ampere hours, which the cell or battery is capable of achieving under the ambient charging conditions and procedures.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability by dense gases. Preferred plasticizers include, for example, dibutyl phthalate, dioctylphthalate, and acetates, glymes, and low molecular weight polymers.

In operation, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and polymeric matrix. The anode and/or cathode may each include a current collector.

The term "activation" refers to the placement of an inorganic salt and electrolyte solvent into an electrochemical cell precursor. After activation, the electrochemical cell is charged by an external energy source prior to use.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidenedifluoride and hexafluoropropylene dissolved in acetone or other suitable solvent(s). Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, LiNiVO$_4$, or LiCoVO$_4$, and (2) the anode comprises carbon, the electrolytic solvent preferably comprises a mixture of ethylene carbonate and dimethyl carbonate. For electrochemical cells where the cathode comprises vanadium oxides, e.g., V$_6$O$_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethy-1-1, 3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1, 3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α, γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., LiCoO$_2$ and LiCoVO$_4$, lithiated manganese oxides, e.g., LiMn$_2$O$_4$, lithiated nickel oxides, e.g., LiNiO$_2$ and LiNiVO$_4$, and mixtures thereof. Cathode-active material blends of Li$_x$Mn$_2$O$_4$ (spinel) is described in U.S. Pat. No. 5,429,890 which is incorporated herein. The blends can include Li$_x$Mn$_2$O$_4$ (spinel) and at least one lithiated metal oxide selected from Li$_x$NiO$_2$ and Li$_x$CoO$_2$ wherein 0<x≦2.

The present invention employs cathode active blends comprising Li$_x$Mn$_2$O$_4$ (spinel) and Li$_y$-α-MnO$_2$ (0≦y<1) which is Li$_y$NH$_4$Mn$_8$O$_{16}$ (0≦y<1) which has a hollandite-type structure. Li$_y$-α-MnO$_2$ where 0≦y<0.5 is preferred. αMnO$_2$ can be synthesized by precipitation from a reaction between a MnSO$_4$ solution and (NH$_4$)$_2$S$_2$O$_8$ as an oxidizing agent.

Lithiation (also referred to as prelithiation) of αMnO$_2$ can be accomplished via a solid state reaction:

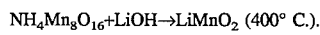

$$NH_4Mn_8O_{16}+LiOH \rightarrow LiMnO_2 \text{ (400° C.)}.$$

Li-α-MnO$_2$ retains the same structure as Hollandite. See, Botkovitz et. al., J. of Power Sources, 43–44 (1993) 657–665, which is incorporated herein, for a discussion of the structure and electrochemical characteristics of Li-α-MnO$_2$. Li$_y$-α-MnO$_2$ 0≦y<0.5 is commercially available from SEDEMA, Tertre, Belgium.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA co polymers, and the like; from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of an inorganic ion salt. Generally, the amount of the salt is from about 1 to about 25 weight percent. (All weight percents are based on the total weight of the cathode..)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

The term "physical mixture" refers to substances which are mixed but not chemically combined. Physical mixtures are non-homogeneous, even if particulate, and may be separated mechanically.

Methodology

Electrochemical cells are, known in the art. See, for example, U.S. Pat. Nos. 5,429,890, 5,300,373, 5,316,556, 5,346,385, 5,262,253, 4,472,487, 4,668,595, and 5,028,500, all of which are incorporated herein. The inventive cathode can be employed in fabricating the cathode structures in prior art electrochemical cells.

In the practice of the present invention the cathode powder comprises a mixture of $Li_xMn_2O_4$(spinel) ($0<x\leq2$) and $Li_y$-$\alpha$-$MnO_2$ ($0<y<1$) in weight a ratio of from about 1:10 to 10:1 preferably 1:5 to 5:1 and more preferably 1:1. The following illustrates a method of how an electrolytic cell could be fabricated with the inventive cathode-active material blend. Examples 1 and 2 describe the process of preparing the anode and cathodes, respectively. Example 3 describes the procedures for fabricating a solid electrolytic cell.

The invention will be described using the anode and cathode structures wherein electrode materials (or films) are laminated onto both sides of the current collectors, however, it is understood that the invention is applicable to other configurations, for example, where one side of the anode and/or cathode current collector is laminated.

EXAMPLE 1

The anode current collector employed was a sheet of expanded copper metal that is about 50 μm thick. It is available under the designation 2Cu5-125 (flatten) from Delker, in Branford, Conn.

The anode slurry was prepared as follows:

A polymer mixture comprising a copolymer of polyvinylidenedifluoride (PVDF) and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture was prepared separately by first adding 23.4 grams of graphite into 0.9 grams of carbon black into a solution containing 60 grams acetone, 10.5 grams dibutyl phthalate, and 0.5 grams of a surfactant. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willbroeck, Belgium. Preferred surfactants include Pluronic FC68™ from BASF, Mt. Olive, N.J. and Flurad 430™ from 3M Co. St. Paul, Minn. The surfactant disperses the graphite. The graphite mixture was then vigorously mixed in a high shear mixer until a substantially homogeneous blend was formed. A suitable mixer is available from Ross Model ME100DLX, Hauppauge, N.Y., operating at its highest setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 2

The cathode current collector employed was a sheet of expanded aluminum that is about 50 μm thick. The aluminum grid is available under the designation 2AL5-077 from Delker, in Branford, Conn.

The cathode slurry was prepared as follows:

A polymer mixture comprising a copolymer of polyvinylidenedifluoride (PVDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by first adding 28.9 grams of a cathode-active material blend comprising $Li_xMn_2O_4$ (spinel) ($0\leq x<2$) and $Li_y$-$\alpha$-$MnO_2$ ($0\leq y<1$) (1:1 weight ratio), 2.4 grams of carbon black (Super P™) into a solution containing 60 grams acetone, 8.7 grams dibutyl phthalate, and 0.5 grams of a surfactant. The mixture was then vigorously mixed in the a high shear mixer until a substantially homogeneous blend was formed.

The cathode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The polymeric matrix is formed by casting a polymeric slurry comprising acetone, dibutyl phthalate, silanized fumed $SiO_2$, and the PVDF/HFP copolymer on a suitable substrate or carrier web and allowing the acetone to evaporate. No curing by radiation is required. The $SiO_2$ is a filler which impart toughness and strength to the film. In addition, it is believed that the $SiO_2$ assists the activation process by creating phyico-chemical conditions such that the electrolyte solution quickly and completely fills the pores created by the extraction of the dibutyl phthalate. Preferably, the polymeric slurry is mixed under low shear conditions as not to degrade the copoloymer.

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50K to 750K, more preferably 50K to 200K, and most preferably 50K to 120K. Furthermore, it is preferred that polymer or copolymer has a narrow molecular weight have range. Preferably $M_n/M_w \approx 1.0$.

Next the dibutyl phthalate plasticizer is extracted from the precursor. Extraction can be accomplished using conventional organic liquid solvents such as diethyl ether or by a dense fluid or gas which refers to a gas compressed and heated to either supercritical or subcritical conditions to achieve liquid-like densities. Dense gases and fluids are known in the art. See, for example, U.S. Pat. Nos. 5,013,366, 5,267,455, 4,219,333, 4,012,194, and 3,969,196, which are incorporated herein. A preferred dense gas is carbon dioxide. The precursor is than pre-packaged in moisture-impermeable material which is described, for example, in U.S. Pat. No. 5,326,653 which is incorporated herein, before being activated. Activation preferably occurs in an inert (e.g., argon) atmosphere. Finally, the packaging is sealed and the electrochemical cell is ready for use.

Utility.

FIG. 2 displays the differential capacity during charge (above voltage axis) and discharge (below voltage axis) vs. cell voltage of a solid, secondary lithium cell composed of a solid electrolyte, a lithium metal anode and a cathode whose cathode-active materials comprises $Li_y\text{-}\alpha\text{-}MnO_2$. The solid electrolyte is composed of a mixture of ethylene carbonate and demethyl carbonate and $LiPF_6$ salt in a EPDM matrix.

FIG. 3 displays the voltage profile of the cell of FIG. 2 vs. the capacity over a complete charge/discharge cycle.

FIG. 4 displays the voltage profile of a solid secondary lithium cell as of FIG. 2 except the cell cathode is composed of a physical mixture of $Li_y\text{-}\alpha\text{-}MNO_2$ and $Li_xMn_2O_4$ in 1:1 weight ratio vs. the capacity over a complete charge/discharge cycle.

FIG. 5A and 5B display the discharge ratio and recharge capacity, respectively vs. cycle for the cell of FIG. 4. During the cycles 1–21, the discharge and charge current was 0.25 $mA/cm^2$. Thereafter the discharge current was increased to 1.0 $mA/cm^2$ while the charge current remained at 0.25 $mA/cm^2$.

While the invention has been described in terms of various preferred embodiments, the skilled artisan will appreciate that various modifications, substitutions, omissions and changes may be made without departing from the spirit thereof. Accordingly, it is intended that the scope of the present invention be limited solely by the following claims.

What is claimed is:

1. A solid secondary electrochemical cell which comprises:

a solid solvent containing electrolyte interposed between an anode composed of anodic material and cathode composed of cathodic material wherein said electrolyte comprises an inorganic ion salt and a solid polymeric matrix;

wherein said cathode comprises a physical mixture of $Li_xMn_2O_4$(spinel) wherein $0<x\leq2$ and $Li_y\text{-}\alpha\text{-}MnO_2$ wherein $0\leq y<1$.

2. A solid secondary electrochemical cell according to claim 1 wherein said anode comprises a carbon material selected from carbon black, coke, graphite, and mixtures thereof.

3. A solid secondary electrochemical cell according to claim 1 wherein said anode comprises an intercalation carbon anode.

4. A solid secondary electrochemical cell according to claim 1 wherein said cathode comprises $Li_xMn_2O_4(0<x\leq2)$ and $Li_y\text{-}\alpha\text{-}MnO_2$ $(0\leq y<1)$ in a weight ratio of about 1:1.

5. A solid secondary electrochemical cell according to claim 1 wherein said cathode comprises $Li_xMn_{2O4}(0<x\leq2)$ and $Li_y\text{-}\alpha\text{-}MnO_2$ $(0<y<0.5)$.

6. A solid secondary electrochemical cell according to claim 3 wherein said cathode comprises $Li_xMn_2O_4(0<x\leq2)$ and $Li_y\text{-}\alpha\text{-}MnO_2$ $(0\leq y<0.5)$.

7. A solid secondary electrochemical cell according to claim 4 wherein said cathode comprises $Li_xMn_2O_4(0<x\leq2)$ and $Li_y\text{-}\alpha\text{-}MnO_2$ $(0\leq y<0.5)$ in a weight ratio of about 1:1.

8. A battery comprising at least two of the cells of claim 1.